Figure 1:
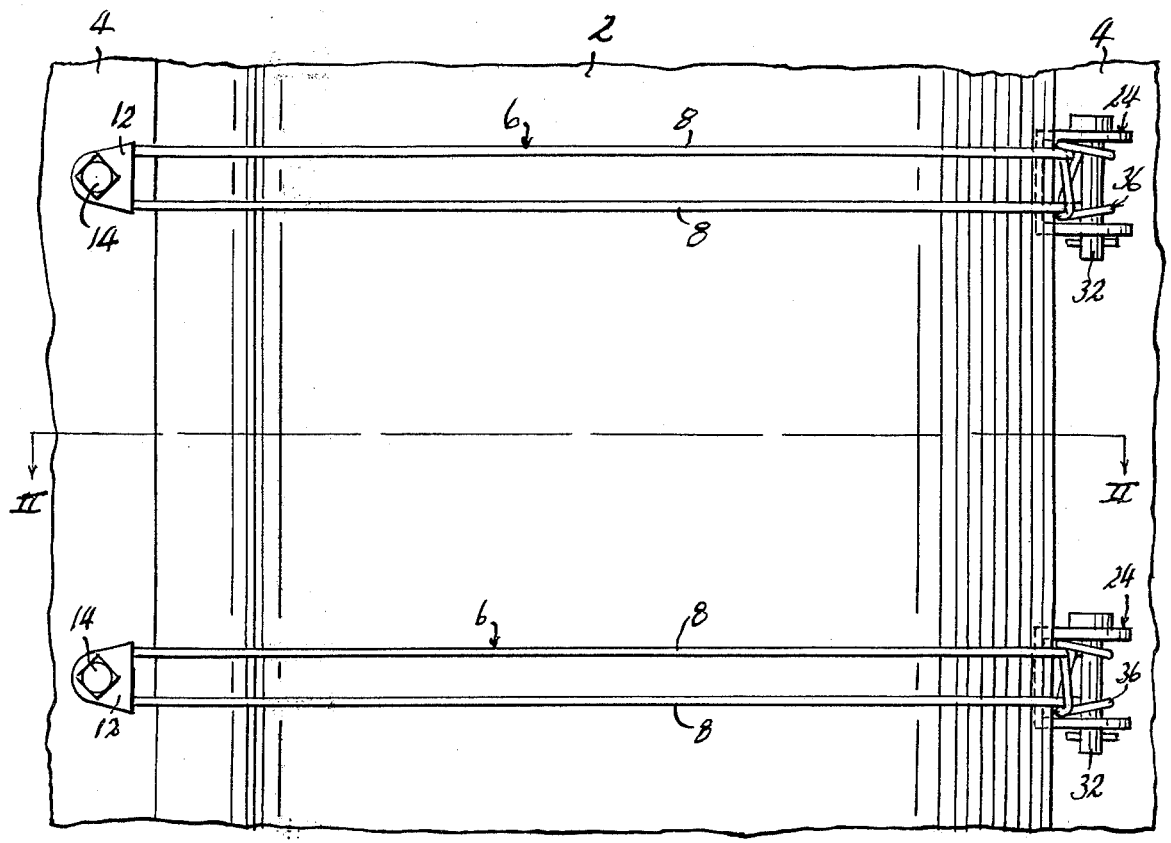

United States Patent [19]

Mundell et al.

[11] 4,337,004
[45] Jun. 29, 1982

[54] CONNECTOR TERMINUS FOR WIRE MEMBERS

[75] Inventors: Donald D. Mundell; Lloyd E. Tieman, both of Carthage, Mo.

[73] Assignee: Flex-O-Lators, Inc., Carthage, Mo.

[21] Appl. No.: 197,932

[22] Filed: Oct. 17, 1980

[51] Int. Cl.³ ............................................... F16B 1/00
[52] U.S. Cl. ........................................ 403/209; 24/29
[58] Field of Search ............... 403/206, 209, 208, 214; 24/29, 28, 283

[56] References Cited

U.S. PATENT DOCUMENTS

| | | | |
|---|---|---|---|
| 1,213,125 | 1/1917 | Olson | 403/206 X |
| 1,369,755 | 2/1921 | Rutledge | 24/283 |
| 3,952,375 | 4/1976 | Mailliet | 403/206 |

*Primary Examiner*—Andrew V. Kundrat
*Attorney, Agent, or Firm*—John A. Hamilton

[57] ABSTRACT

A connector terminus for an elongated member consisting of a pair of spaced apart generally parallel wires, said terminus being formed entirely of the wires themselves and consisting of a loop formed in each of the wires in spaced relation from its end, the loops being coaxial transversely of said member for receiving a retainer pin to complete an actual connection, the extreme end portion of each wire being looped around the side of its standing portion distal from the other wire and extended toward and connected to the other wire to form lever arms resisting any force tending to pull the wires free of the retainer pin.

11 Claims, 13 Drawing Figures

CONNECTOR TERMINUS FOR WIRE MEMBERS

This invention relates to new and useful improvements in terminal formations of wire members to enable them to be securely attached to any other member.

The connection of raw wire ends to another member is a distinct problem, particularly if the wires are of a high strength, high carbon spring steel, as is often required to meet strength requirements. Welded connections are very difficult with this type of wire, and are unsatisfactory from the standpoint of durability, since the welding causes crystallization of the steel which can lead to early breakage or failure of the wire adjacent the weld, particularly if the connection is subjected to repetitive flexing or vibratory loads. Clamping of the wire ends between jaws causes extreme concentration of wire stresses where the wires enter between the jaws, and can also lead to early breakage. Such wire is also difficult to bend about short radii for the purpose of making connections, and such short-radius bends can cause crystallization leading to early failure of the wires.

The object of the present invention is the provision of a connector terminus for an elongated member consisting of a pair of spaced apart generally parallel body wires, which terminus does not, in most of its forms, require welding of the wires or clamping of the wires between jaw members, and which also in most of its variations is formed entirely of the wires themselves. Generally, the terminus is formed by a special configuration or intertwining of the wires, by forming a loop in each wire in spaced relation from its end, the loops being coaxial transversely of the member for receiving a retainer pin therethrough to complete an actual connection, the extreme end portion of each wire being formed to loop around the side of its standing portion distal from the other body wire and then extended toward said other body wire to form a lever arm connected to said other body wire.

Each of said levers may extend to and be braced by its abutment with the opposite body wire, in which case no welding, clamping, or use of any extra connectors are required, or the two levers may be joined together by welding, clipping or the like, so that each serves as a functional part of the other. The levers are connected in relatively slightly stressed portions of the wires, where the weakening effect of welding can safely be tolerated.

Another object is the provision of a wire connector terminus of the character described which is well adapted to withstand repetitive flexing or vibratory loads. The loops may pivot on a retainer pin and the lever arms may flex when subjected to repetitive or vibratory loads, thereby reducing the shock effect of such loads.

Other objects are simplicity and economy of construction, the terminus being well adapted for production by automatic machinery, and efficiency and dependability of operation.

Figure 2:
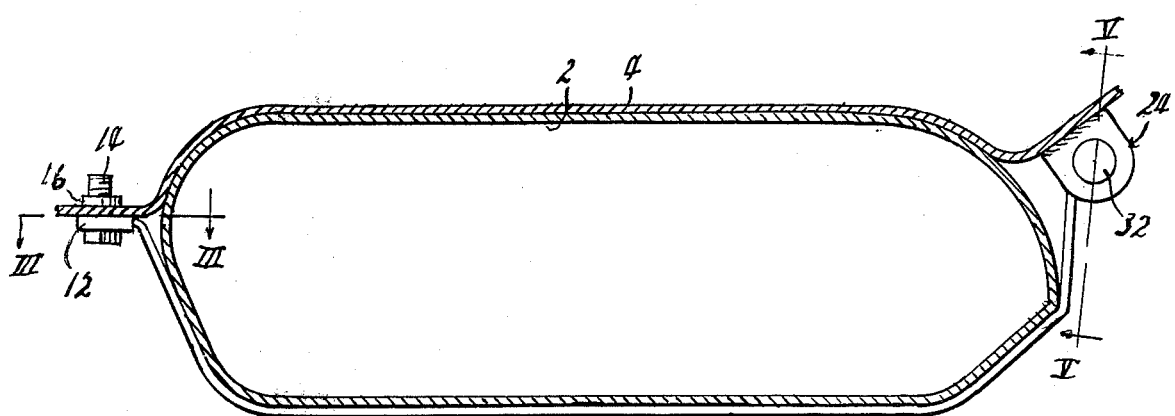
Figure 3:
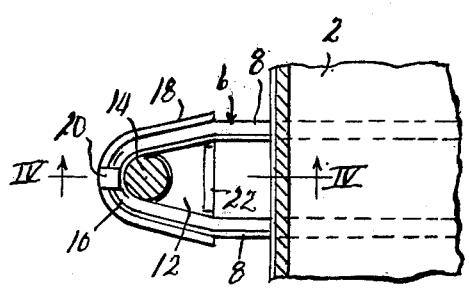
Figure 4:
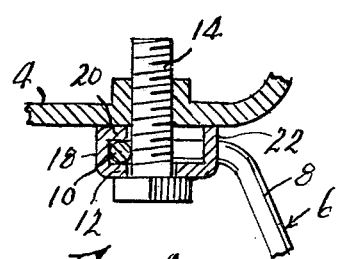
Figure 5:
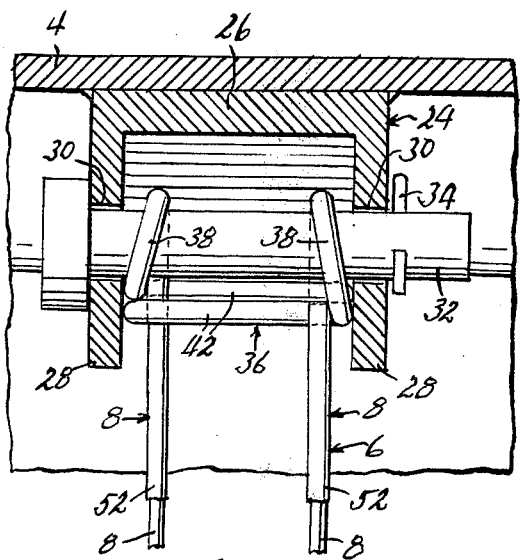
Figure 6:
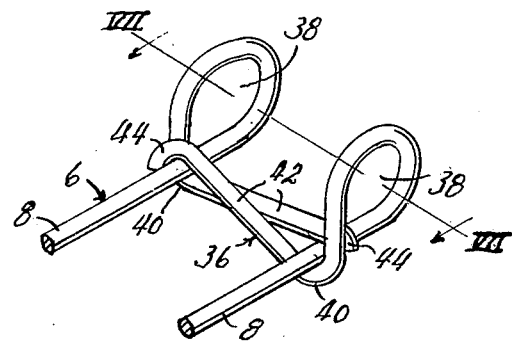
Figures 7, 8:
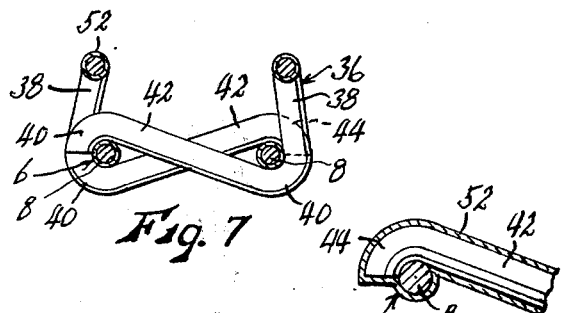
Figure 13:
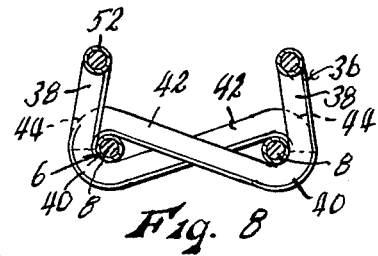

With these objects in view, as well as other objects which will appear in the course of the specification, reference will be had to the accompanying drawing, wherein:

FIG. 1 is a fragmentary inverted plan view of an automobile gasoline tank secured to an automobile body by a pair of wire hanger straps each utilizing a connector terminus embodying the present invention, as a non-restrictive example of a practical application of the invention, FIG. 2 is a fragmentary sectional view taken on line II—II of FIG. 1, FIG. 3 is an enlarged fragmentary sectional view taken on line III—III of FIG. 2, FIG. 4 is a fragmentary sectional view taken on line IV—IV of FIG. 3, FIG. 5 is an enlarged, fragmentary sectional view taken on line V—V of FIG. 2, and also illustrating a slight modification of structure, FIG. 6 is a perspective view of the end portion of one of the wire straps of FIGS. 1-4, showing a terminus according to the present invention, FIG. 7 is a sectional view taken on line VII—VII of FIG. 6, including the modification of FIG. 5, FIGS. 8-12 are views similar to FIG. 7, each showing another slight modification of structure, and FIG. 13 is a general sectional representation of a representative wire crossing occurring in the wire terminus, illustrating another slight modification of structure.

Like reference numerals apply to similar parts throughout the several views, and in FIGS. 1-3, the numeral 2 applies to an automobile gasoline tank, which is fitted upwardly into a downwardly opening recess formed in the floor 4 of the automobile body, and secured therein by a plurality, two shown, of straps each designated generally by the numeral 6, said straps passing beneath the tank and being secured at their ends to floor 4. Conventionally, each strap 6 is formed of a wide band of sheet metal, and secured at its ends to floor 4 by machine screws or the like. However, in the present quest of the automobile industry to eliminate all possible weight, it has become apparent that each strap could advantageously be formed in skeleton form, by a pair of spaced apart parallel body wires 8. Provided that the wires are of sufficient strength, this consideration usually requiring wires of high strength, high carbon spring steel and of about 0.12 inch diameter, a strap may be provided having less than one-half the weight of a comparable sheet metal strap, and with no sacrifice of strength. If two straps are used, as shown, the wire form provides a weight reduction of about one pound per automobile, and this saving is considered to be significant.

However, the use of straps each consisting of a pair of parallel wires creates certain problems in the attachment of the wire ends to floor 4. If each strap is formed from a single length of wire, bent to a U-form at its mid-point, as at 10, the connection of the looped end to the car body floor presents no special problems, a sample connection being shown in FIGS. 1-4, in which a sheet metal clip 12 is placed under bend 10 of the wire and secured to floor 4 by a machine screw 14 passing upwardly through said clip and wire bend 10, and threaded into a threaded boss 16 of floor 4. The clip is provided with a raised lip 18 surrounding the outside of the bend to confine the wire bend 10 closely about screw 14, an inturned tab 20 for securing the wire bend in the clip, and a raised lip 22 disposed between the parallel reaches of the wire to maintain a proper spacing therebetween. Such a connection is simple and effective, but is not per se a part of the present invention.

The principal connection problems occur at the free ends of wires 8. As previously discussed, they cannot effectively be welded or clamped, since these operations result in crystallization and/or stress concentrations which can lead to early fracture failures, and also cannot be bent to very small radii of curvature. The present invention contemplates a terminal formation of wires 8 at the free ends thereof which not only provides for secure connection of the strap to a fixed retainer pin or the like, but does so in most of its forms without requiring welding of the wires or any other heat operation, which does not require vise-like clamping of the wires, and which involves no sharp bending of the wires. Some forms utilize welding of the wires, but only in relatively little-stressed portions of the wires, where it can be tolerated.

Referring to FIGS. 1, 2 and 5, the strap 6 is to be connected to a bracket 24 welded or otherwise affixed to floor 4. Said bracket is U-shaped, having a base 26 fixed to floor 4, and a pair of parallel, projecting ears 28 (see FIG. 5) projecting from said base, at respectively opposite sides of strap 6. Said ears have aligned holes 30 formed therethrough for securing a retainer pin 32 therein, the pin being releasably secured in the bracket by a cotter key 34 or the like. The present invention relates to a special formation 36 of the free end portions of wires 8 which provides for their secure connection to retainer pin 32.

One species of formation 36 is shown in FIGS. 1, 5, 6 and 7, most clearly in FIGS. 6 and 7. In this species, as in all others, each wire 8 is first bent to form a loop 38 adjacent but spaced apart from its extreme end. Said loop lies in a plane perpendicular to plane defined by wires 8, and is disposed at one side of said plane. The loops 38 of the two wires are coaxial with each other on an axis parallel to the plane of wires 8, but transverse to the general extent of the strap, in order to be aligned for receiving retainer pin 32 therethrough. The end portion of each wire is then bent around the standing portion of itself, at the side thereof distal from the other of wires 8, and around the side thereof opposite to that at which loop 38 is disposed. This bend is indicated at 40. The extreme end portion of each wire is then extended transversely of the strap toward the other of wires 8, to form a lever arm 42. In this species, each lever arm extends all the way to the other wire 8, overlying the side of said other wire opposite to that encircled by bend 40 of said other wire, and is preferably bent to at least partially hook around the standing portion of said other wire, as indicated at 44. In this species only, lever arms 42 are parallel when received normally to the plane of the strap, as in FIG. 5, with one hook 44 disposed inside of the loop 38 of the other wire, and the other hook 44 disposed outside of its associated loop 38, as shown.

In use, it will be seen that any longitudinal tension on strap 6, to pull it free from retainer pin 32, must pull or "unwind" wires 8 around said retainer pin, and also "unwind" the bends 40 of the wires around their standing portions. Lever arms 42, braced at their free ends by their abutment at 44, each against the standing portion of the other wire, strongly resist any such "unwinding" movement of the wires in loop portions 38 and bends 40 thereof, and hence provide a very strong connection, despite the fact that the wires are not welded together nor rigidly joined together at any point. The engagement of the hook portions 44 of the lever arms, each about the standing portion of the opposite wire 8, also assists in preventing the wires from pulling loose. Also, the lever arms are free to some extent to flex transversely when loaded, and then to recover resiliently, tending to resist any tendency of the connection to pull free in the event the loading of the strap is intermittent or vibratory. Extensive testing has shown that the connector terminus shown is fully adequate to meet any reasonable load requirements. The form of the terminus shown in FIGS. 1, 5, 6 and 7 has the advantage, as compared to the other forms to be described, that it is the simplest to be formed by automatic wire bending machinery.

FIG. 8 shows a form of terminus 36 which is the same as that heretofore described, except that both of the terminal hooks 44 of lever arms 42 are disposed outside of the wire loops 38, instead of one inside and one outside as indicated in FIGS. 5, 6 and 7. As will be apparent, the FIG. 8 form requires a slight twisting together of lever arms 42 intermediate the standing portions of wires 8, and is therefore slightly more difficult to form on automatic machinery, but this form has the advantage of leaving loops 38 of the wires completely unobstructed for the passage of pin 32 therethrough. In any form of the terminum in which either of hooks 44 is disposed within a loop 38, that loop must be of sufficiently large size that the hook does not obstruct the loop against the passage of the pin.

Figures 9, 10:
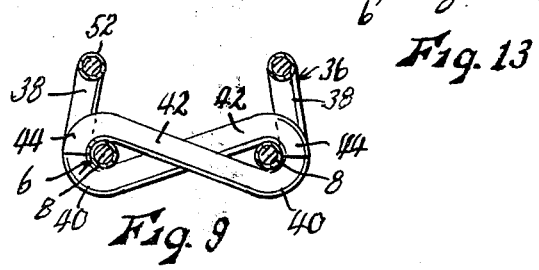

FIG. 9 shows a terminus 36 similar to those already described, except that both of hooks 44 are disposed inside of their associated loops 38. Here again, this form is slightly more difficult to produce on automatic wire bending machinery, but has the advantage of being more secure than the others so far described, and permitting greater loads on strap 6. If a load sufficient to initiate unwinding of the wires from pin 32 is imposed on the strap, lever arm portions 42 of the wires tend to angle away from pin 32, or downwardly as viewed in FIG. 5, and the inclusion of hooks 44 within loops 38 tends to prevent this movement, and hence to increase the strength of the connection. Even in the forms shown in FIGS. 5-8, any such movement of any hook 44 disposed outside of its associated loop 38 away from pin 32 is resisted to some degree by the engagement of the hook over the standing portion of its associated wire 8.

Figure 11:
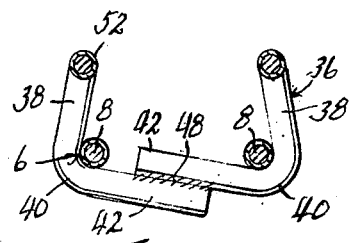
Figure 12:
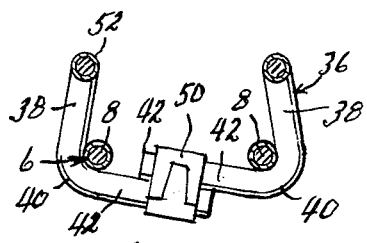

FIGS. 10-12 show modifications of structure wherein lever arms 42 are shortened and connected to each other rather than being braced respectively against the opposite body wire 8 as in FIGS. 7-9. In FIG. 10, the shortened lever arms are abutted end-to-end and welded together as indicated at 46. In FIG. 11, the lever arms are overlapped and welded together as indicated at 48, and in FIG. 12, they are overlapped and clamped together by a sheet metal clip 50 of any common and well known type. The forms of the terminus shown in these views do involve welding or clamping, which for the reasons discussed above are considered to be generally objectionable in wire connections requiring considerable degrees of strength. However, as shown the welds and clips are confined to portions of the wire, namely lever arms 42, which in normal use are not subjected to high degrees of stress. In these portions of the wires, welding or clamping can generally be tolerated within the purview of this invention. In these forms, each lever arm serves as a portion of the other, insofar as its lever functions are concerned.

In FIGS. 7-9, it will be noted that the distance, transversely of strap 6, between the extreme ends of hooks 44 is equal to the spacing between the outer sides of bends 40. Thus, when the terminus 36 is confined closely between ears 28 of bracket 24, as shown in FIG. 5, the lever arms act as struts maintaining the wire loops in properly spaced relation on pin 32. The radial extent of ears 28 from pin 32 should be sufficient to engage both bends 40 and the ends of lever arms 42. This strut function is particularly important where, as in FIGS. 7-9, the wires are not welded or otherwise rigidly connected at any of their crossings, with the result that they could shift more or less freely at said crossings, if it were not for this strut action of the lever arms. Movement of loops 38 toward or from each other on pin 32 could seriously impair the strength of the connection.

In many cases it may be desirable that wires 8 be provided with a coating 52 of corrosion-resistant waterproof material such as a low density polyethylene, both to protect them against rust, and to prevent electrolytic corrosion between said wires and any other object they may contact, such as gasoline tank 2. This coating may be applied before terminus portion 36 thereof is formed, as indicated in FIGS. 5 and 7-12, but preferably is applied, as by dipping of the strap, after formation 36 is completed, as indicated in FIG. 13, thus tending to secure and hold the various portions of the formation in proper relation. As previously noted, particularly the forms of the terminus shown in FIGS. 7-9 are comparatively free to be deformed by shifting of the various wire crossings, at least until the formation is secured in bracket 24 by retainer pin 32, after which structural integrity of the formation is preserved by the strut function of lever access 42. Coating 52 cannot hold all portions of the formation in proper relation under the stresses normally encountered in actual usage, but can preserve said formation until it is installed in bracket 24. This is a useful function when the strap is to be sold as a completely preformed unit for later installation, as in an automobile assembly operation. However, the use of wire terminus 36 on a wire strap for securing a gasoline tank to an automobile body is exemplary only. The wire terminus forming the subject matter of the present invention has a wide generally applicability in many environments.

While we have shown and described certain specific embodiments of our invention, it will be readily apparent that many minor changes of structure and operation could be made without departing from the spirit of the invention.

What we claim as new and desire to protect by Letters Patent is:

1. A connector terminus formation for an elongated strap comprising a pair of spaced apart, generally parallel first and second body wires, said formation comprising a loop formed in each wire adjacent but spaced apart from its free end generally in a plane at right angles to a plane defined by said body wires but parallel to the longitudinal extent of said strap, said loops being coaxial on an axis parallel to the plane of the body wires but transverse to the general extent of said strap for receiving a retainer pin therethrough to complete an actual connection of said strap, the extreme end portion of each body wire being trained about the side of the standing portion of itself distal from the other of said body wires and extending transversely of said strap toward said other body wire to form a lever arm, and restricting means inhibiting movement of the free end of each of said lever arms relative to said other body wire.

2. A wire terminus formation is recited in claim 1 wherein the free end of each of said lever arms overlies and abuts the side of said other body wire opposite the side of said other body wire about which the other wire is trained to originate the other lever arm, whereby to provide said restricting means.

3. A wire terminus formation as recited in claim 2 wherein said body wires, including said terminus formation, are provided with a coating of waterproof plastic to inhibit corrosion of said wires, and also operable to secure said wires together at their various points of contact within said formation, whereby to maintain the structural integrity of said formation until it is assembled with said retainer pin.

4. A wire terminus formation as recited in claim 2 wherein the free end portion of each of said lever arms is provided with a hook formation at least partially encircling said other body wire.

5. A wire terminus formation as recited in claim 2 wherein said lever arms are generally parallel in a direction transverse to the general extent of said strap, the free end of the first of said lever arms being disposed within the loop formed in the second of said body wires, and the free end of the second of said lever arms being disposed outside of the loop of the first of said body wires.

6. A wire terminus formation as recited in claim 2 wherein said lever arms are twisted slightly together intermediate said body wires, and the free ends thereof are each disposed outside of the loop of the other body wire.

7. A wire terminus formation as recited in claim 2 wherein said lever arms are twisted slightly together intermediate said body wire, and the free ends thereof are each disposed within the loop of the other body wire, whereby to be confined between said loop and said retainer pin.

8. A wire terminus formation as recited in claim 1 including means rigidly interconnecting the extended ends of said lever arms together, whereby to provide said restricting means.

9. A wire terminus formation as recited in claim 8 wherein the free ends of said lever arms are welded together.

10. A wire terminus formation as recited in claim 8 wherein said means connecting the free ends of said lever arms together constitutes a sheet metal clip encircling and clamping said lever arms together.

11. A wire terminus formation as recited in claim 1 wherein the free end of each of said lever arms overlies and abuts the side of said other body wire opposite to the side of said other body wire about which the other wire is trained to originate the other lever arm, and adapted for use with a bracket having parallel ears normal to said retainer pin and perforated to receive said retainer pin, said terminus formation loops encircling said pin intermediate said bracket ears, the distance between the extreme ends of said lever arms, transversely of said strap, being substantially equal to the maximum width of said strap across the loops of said formation, and to the transverse spacing between said bracket ears, whereby when said formation loops are engaged on said retainer pin, said lever arms cooperate with said bracket ears, acting as struts for maintaining a proper spacing of said formation loops on said retainer pin.

* * * * *